Sept. 7, 1937.    D. D. WAYNICK    2,092,100
COMBINED FERTILIZER AND SOIL CONDITIONER
Filed Oct. 5, 1934
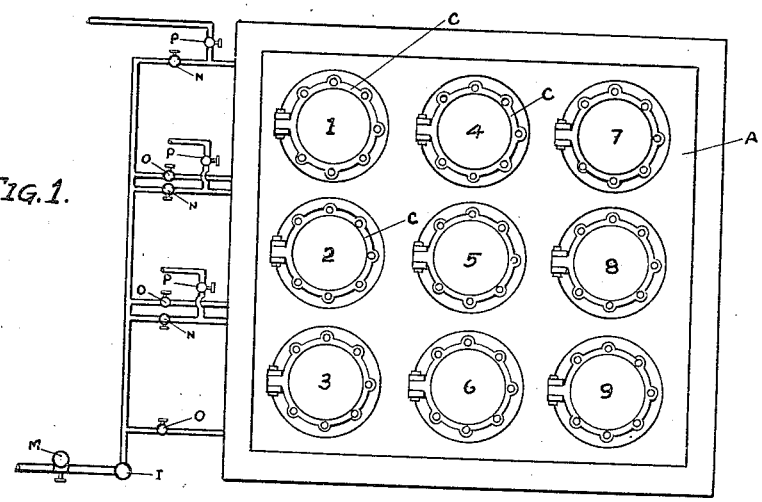
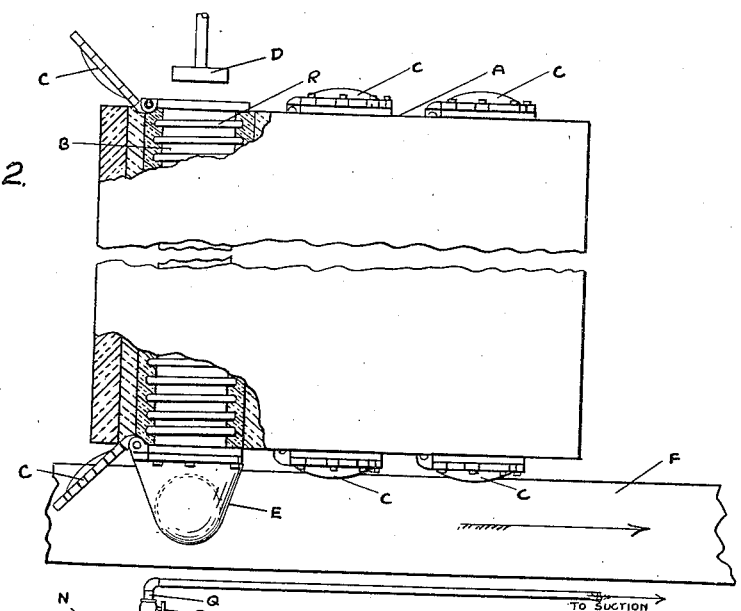
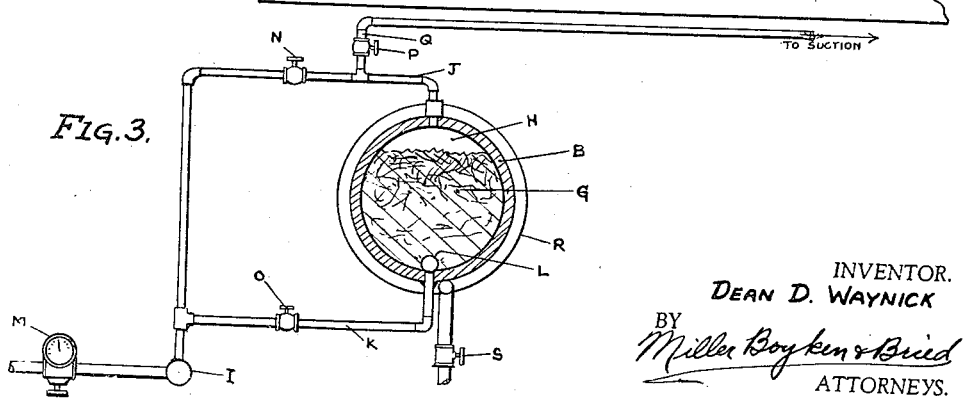
INVENTOR.
DEAN D. WAYNICK
BY Miller Boyken & Bried
ATTORNEYS.

Patented Sept. 7, 1937

2,092,100

UNITED STATES PATENT OFFICE 2,092,100

COMBINED FERTILIZER AND SOIL CONDITIONER

Dean D. Waynick, Anaheim, Calif., assignor to The Pacific Lumber Company, San Francisco, Calif., a corporation of Maine Application October 5, 1934, Serial No. 747,031

3 Claims. (Cl. 71—23)

This invention relates to fertilizers and soil conditioners, and has for its principal object an improved product combining the properties of a fertilizer and soil conditioner which will have desirable characteristics not found in prior products of this nature. Other features and advantages of the invention will appear in the following description.

In the drawing accompanying this specification Fig. 1 is an end elevation of a battery of cylindrical retorts for carrying out the ammonia treatment of the material used.

Fig. 2 is broken plan view of Fig. 1 with portions broken away to more clearly show the construction.

Fig. 3 is an enlarged cross section of one of the tubes or retorts of Fig. 1 showing the charge of material for treatment, and piping arrangement.

Briefly described, the improved fertilizer may be said to be the reaction product of finely shredded fiber and dust-like particles of the bark of the redwood tree—Sequoia sempervirens and Sequoia gigantea—with ammonia under pressure and heat, as by autoclaving.

It is known that peat, sawdust, and other materials, will absorb ammonia under pressure and heat, and that the product has certain fertilizing value, but I have discovered that by the use of specially prepared redwood bark fiber and dust, a product may be obtained carrying a high nitrogen content which will be made available to plant roots in various types of soils over an extra long period of time, while the extraordinary resistance of redwood bark fibers to decomposition when intermixed in heavy soil insures the required lightening or conditioning of the same for periods not generally obtained with other products. Also, the redwood bark being a material obtainable in large quantities of uniform definite properties yields a uniform definite product which may always be relied upon to produce a desired result.

The bark of the redwood tree, native in California, runs from a few inches to a foot or more in thickness, in fact over ten tons of the bark being sometimes obtained from a single tree. In preparation of the bark for my purpose, the extreme outer portion or epidermis is generally discarded or rubbed off in stripping and handling the bark and getting it to the mill or shredding plant, and that portion lying between the epidermis and the cambium is fed through shredding machines of any desired type to separate the fibers which are quite fine and strong, in fact resembling somewhat fine red hair. Hammer type of shredders in which high speed revolving weights or hammers rain blows upon the bark as it is fed along have been found preferable for the work, though other types of comminuting machines have been successfully used.

In thus shredding the bark, about half of the product is in the form of a powdery matter released from between the fibers proper, together with much dust and short broken fibers, all of which is separated from the longer fibers by screening, and forms the principal material used to produce the product of my invention, though I may mix various additions of the longer fiber with it, or use the latter alone for extra heavy soils where the soil lightening feature of the product is paramount.

In treating the comminuted redwood bark product with ammonia I may use either aqua ammonia or anhydrous ammonia, and in the latter case the material is first moistened with water. I have tried various amounts of moisture from 5% to 60%, various pressures of ammonia gas, and temperatures of treatment in autoclaving the material, and for time periods running from an hour to twenty-four hours or more in order to determine the conditions most suitable to yield an ammoniated product of maximum nitrogen content, and I find that with the material carrying from about 25% to about 40% of moisture and anhydrous ammonia applied in the autoclave at from about 75 to 100 pounds pressure per square inch until equilibrium is established and the autoclave maintained at a temperature ranging from about 100° to 275° C. for from about 14 to 24 hours, that the resulting product, when dried, will carry from about 8 to 10% or more of nitrogen; also, that generally under similar conditions the finer or dust-containing material will carry considerably more nitrogen than the screened fiber.

I have further discovered that upon admission of the ammonia gas to the autoclave an exothermic reaction speedily takes place with evolution of sufficient heat to maintain the heat required for the duration of the treatment generally without the use of external heat, if radiation be guarded against by the use of heat insulation on the retorts. The reaction also builds up a pressure of several hundred pounds per square inch in the retort, and the product of the treatment is a fibrous black char-like mass.

The exothermic nature of the reaction may be made use of in the commercial production of the treated product with the apparatus shown in the drawing, and wherein Fig. 1 indicates at A a heat-insulated setting in which is mounted a plurality of horizontally disposed steel cylinders or retorts B with their forward gated ends numbered from 1 to 9.

The cylindrical retorts may be of any size or length, though for a commercial plant about 16 inches in diameter and from 12 to 25 feet in length will be found satisfactory. The cylinders should be well heat-insulated and the space between packed with insulation as well. Each cylinder should be provided with a sealing closure at both ends as at C so that the bark material may be introduced at one or both ends and ejected as by a suitable ram D and guided by a portable chute E to a conveyor F or otherwise transported to any suitable form of drying apparatus not shown.

In carrying out the treatment, the moistened bark fiber or dust fiber mixture G is loaded into the first cylinder while leaving a space H along the top for free travel of gases, the sealing heads are closed and anhydrous ammonia from a supply pipe I is admitted through a branch pipe J to the space H, or through a pipe K to a perforated pipe L lying along the bottom of the cylinder. The ammonia gas is admitted from a source not shown, preferably through a pressure regulating valve M set at about 80 pounds pressure and allowed to flow until equilibrium is reached, and after which valve N or O, as the case may be, is turned off and the next cylinder, say #2, handled in a similar manner, and thereafter the other cylinders in succession.

When all cylinders are filled and under gas pressure they are permitted to remain until next day and then respectively emptied and refilled in the same order as before so that each will be given the same length of time for the reaction to be completed.

Before opening a cylinder, valve P is opened and any excess or unreacted ammonia gas is withdrawn through pipe Q for re-use or other purpose, and valve P is then closed. Aqua ammonia of about 28% used in place of the gas in proportions of about 1 c. c. to the gram of the dry fiber material, maintained at about 110° C. for 14 hours and upward, yields a substantially similar reaction and product.

In order to pre-warm the retorts or add extraneous heat in cold weather, or to hasten the reaction, the cylindrical retorts may each be surrounded with steam pipe coils as at R, the coils of each cylinder being individually valved as at S for admission of steam of any desired temperature from a supply pipe T. The coils will of course be suitably drained for condensation, and suitable heat and pressure gages will be fitted to each cylinder.

The product of the reaction is a brownish black fibrous or powdery-fibrous moist mass which is dried in revolving drums and hot air at about 60° C., with or without first centrifugalizing, as equipment may permit. The material loses about 2% of its nitrogen content in the drying operation so that a final product carrying about 10% of nitrogen results. As previously stated, the bark dust-fiber mixture responds better to the reaction and more quickly builds up a high nitrogen content. Also to be noted is the fact that although the untreated dust-fiber mixture is very dusty and difficult to handle in consequence, the treated material is quite free from dustiness and is easily handled and incorporated in the soil. The product is not susceptible to atmospheric moisture and will not cake up in storage. It may be used alone as a combined soil lightener or amendment and nitrogen carrying fertilizer, or in mixed fertilizers where other properties are required. Free ammonia is substantially eliminated by the hot air drying and the nitrogen content is in chemical combination in a form readily available to plants when mixed with the soil. The identity of the various chemical compounds in the product have not yet been determined, but extractions made with alcohol, acetone, carbon bisulphide, etc. have shown value as insecticides.

The untreated material shows upon analysis but about a 0.15% nitrogen content.

Having thus described my invention, what I claim is:—

1. A combined fertilizer and soil conditioner comprising comminuted redwood bark including the dust and other fine particle content thereof but substantially free from its longer fibers, and reacted with ammonia under heat and pressure.

2. The process of preparing redwood bark for fertilizer use which comprises shredding the bark to a finely divided form, separating the longer fiber therefrom and autoclaving the remainder with ammonia in presence of moisture to produce a substantially black material.

3. The process of preparing redwood bark for fertilizer use which comprises shredding the bark to a finely divided form, separating the dust and other fine particles from the long fiber and autoclaving the separated material with ammonia in presence of moisture to produce a substantially black material and drying the material with the aid of heat to substantially remove any free ammonia.

DEAN D. WAYNICK.